United States Patent [19]

Milette

[11] 4,123,414

[45] Oct. 31, 1978

[54] METHOD OF MANUFACTURING REINFORCED PHENOL RESIN ARTICLES, AND PRODUCTS THUS OBTAINED

[75] Inventor: Henri Milette, Chazey-Bons, France

[73] Assignee: Societe Chimique des Charbonnages, Courbevoie, France

[21] Appl. No.: 741,053

[22] Filed: Nov. 11, 1976

[30] Foreign Application Priority Data

Nov. 12, 1975 [FR] France .................................. 75 34448
May 19, 1976 [FR] France .................................. 76 15068

[51] Int. Cl.² .......................... C08L 61/06; B28B 1/32
[52] U.S. Cl. .................................. 260/38; 260/19 N; 264/309; 528/138; 528/140
[58] Field of Search ............... 260/19 N, 39 R, 38 W, 260/17.3, 59, 57 R, 17.2; 264/211, 309; 528/138, 140

[56] References Cited

U.S. PATENT DOCUMENTS

| | | | |
|---|---|---|---|
| 2,075,805 | 4/1937 | Ellis ..................................... | 260/17.3 |
| 2,368,126 | 1/1945 | Fain ..................................... | 260/19 N |
| 2,407,225 | 9/1946 | Dixon ................................... | 260/19 N |
| 2,606,888 | 8/1952 | Williams et al. ..................... | 260/59 R |
| 2,782,233 | 2/1957 | Muetterties .......................... | 260/39 R |
| 2,855,382 | 10/1958 | Mitchell ............................... | 260/17.3 |
| 3,174,940 | 3/1965 | Lacoste ................................ | 260/17.3 |
| 3,789,041 | 1/1974 | Talsma ................................. | 260/39 R |
| 3,810,854 | 5/1974 | Doi et al. ............................. | 260/17.3 |

*Primary Examiner*—Jay H. Woo
*Attorney, Agent, or Firm*—Fleit & Jacobson

[57] ABSTRACT

Method of manufacturing molded articles of liquid phenol resins or resols, obtained by simultaneously projecting onto a mold surface at least one resin of the aforesaid type, glass reinforcing elements and at least one acid catalyst, as main component elements, this method being characterized in that at least one anhydrous and hydrophilous inorganic compound is projected simultaneously with said main component elements in an amount corresponding to 8% to 12% of the weight of liquid phenol resin.

4 Claims, 1 Drawing Figure

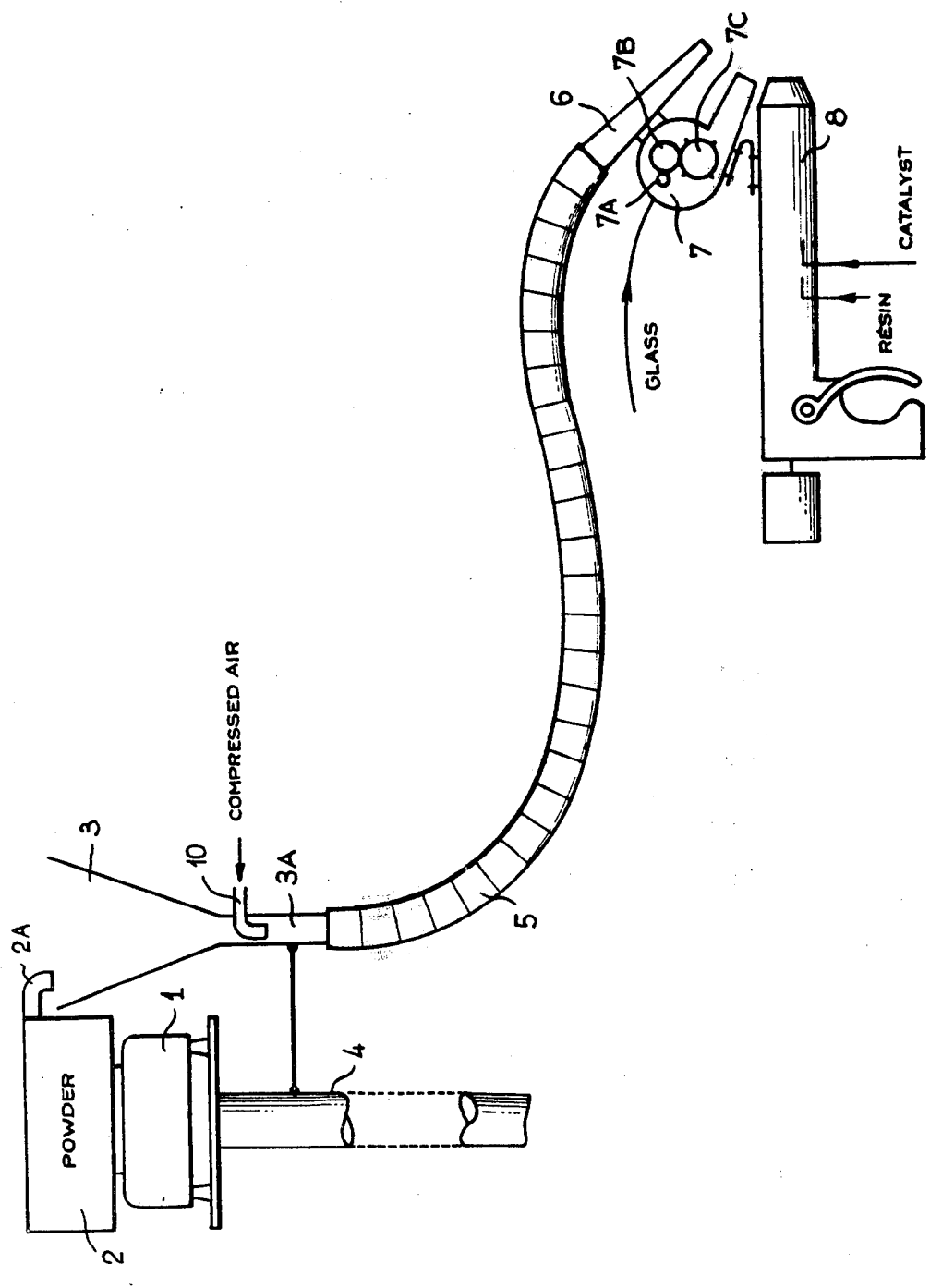

METHOD OF MANUFACTURING REINFORCED PHENOL RESIN ARTICLES, AND PRODUCTS THUS OBTAINED

This invention relates in general to the technique of producing molded phenol articles, and is directed more particularly to molded objects of this type obtained by simultaneously projecting or spraying glass and liquid phenol resin, or resol, onto a mold in order to produce articles having improved properties.

In the manufacture of molded articles it is known to use apparatus for simultaneously spraying liquid phenol resins, resols and cut reinforcing glass. However, components made from acid-resistant materials must be substituted for certain elements in conventional machines, to prevent these elements from being deteriorated by the acid catalysts.

However, also in this case the molded articles thus obtained would not be fully satisfactory from the dual point of view of their mechanical properties and their fire-resistance or their inflammability for a given thickness and a given percentage of glass reinforcement.

In fact, in the resol form phenol acid contains as a rule 12 to 15% by weight of water and the condensation reaction necessary for hardening the product releases additional water.

Now it is extremely difficult to eliminate this water from the finished article and furthermore this excess water is detrimental to a complete resin condensation. Therefore, a complementary baking step to be carried out at a temperature below 100° C is required to prevent the included water from suddenly volatilizing. Eventually, this removal of water yields a more or less microporous structure, and impairs the mechanical properties as well as the aging capacity of the end product.

It is known that the fire resistance of phenol resins is particularly satisfactory and that in the case of a laminated product manufactured from such resins and containing 30% of glass, satisfactory results can reasonably be expected in fire-holding tests. However, it is also known that this fire resistance can be improved by the addition of inorganic substances to the composition. Yet this addition of inorganic substances requires relatively long and costly stirring and mixing operations detrimental to the homogeneous distribution of the glass reinforcing elements, so that the end products though having an improved fire-resistance have poor mechanical properties. Moreover, the viscosity of the initial mixture as well as the water contents of the products are detrimentally affected by these inorganic additives.

After exhaustive research directed to the elimination of the inconveniences of the known methods, Applicant eventually developed a new method of manufacturing molded articles of liquid phenol resins or resols, obtained by simultaneously projecting as main component elements said resins, glass reinforcing elements and an acid catalyst onto a mold surface, this method being characterized in that at least one anhydrous and hydrophilous inorganic component is projected simultaneously, this last-mentioned component being present in the range of 8 to 12% by weight of phenol resin.

This invention is also concerned with an apparatus for carrying out the method broadly disclosed hereinabove and with the molded articles or parts thus obtained, which are characterized by improved mechanical properties and fire resistance.

The starting materials may consist of anyone of the known liquid phenol resins or resols, any desired anhydrous and hydrophilous inorganic material or compound, such as calcium semi-hydrate $(SO_4Ca)_2 \; H_2O$ available commercially under the common name of plaster of Paris. For each molecule of this compound, three water molecules may be fixed according to the following reaction:

$$(SO_4Ca)_2, H_2O + 3H_2O \rightarrow 2[SO_4 Ca, 2H_2O].$$

This invention is also directed to avoid the inconvenience resulting from the fact that commercial semi-hydrated calcium sulfates, such as common plaster of Paris, cannot be used since they contain a certain amount of carbonate causing carbon dioxide gas to be released in the presence of an acid catalyst. This gaseous release leads to the formation of foams and to a certain expansion of the laminated product, in contrast with the scope of this invention which consists in producing a homogeneous glass/resin laminated product free of bubbles and so-called "fish eyes".

According to this invention, calcium sulfate is prepared from neutralized sulfuric acid, whereafter it is dehydrated at a temperature of about 130° C. This temperature should preferably not be overstepped, otherwise anhydrous calcium sulfate would be obtained irreversibly.

According to a modified form of embodiment of this invention, boric anhydride $B_2O_3$ is used in the state of a fine powder as an anhydrous hydrophilous inorganic compound. In fact, in the presence of the water content of resol and also of the water resulting from the formophenol condensation the following reaction takes place:

$$B_2O_3 + 3H_2O \rightarrow 2B(OH)_3$$

In other words, 1 gram-molecule of boric anhydride will combine with 54 g of water, provided however that the boric anhydride employed be properly distributed during the simultaneous projection or spraying contemplated.

However, this hydrophilous inorganic compound should be added during the simultaneous projection, not by mixing it beforehand with resol, for the following two reasons:

maintaining an adequate viscosity of the resin, thus affording a satisfactory projection and a good glass impregnation;

the dehydrating action of the hydrophilous inorganic compound during the condensation, not on the water content of the initial mixture of resol and liquid resin.

Therefore, it is only by causing the anhydrous inorganic substances to intervene at the last moment that the water resulting from the condensation will be absorbed more completely and that the mass of free water contained in the molded article will be kept at a minimum value.

This invention is also concerned with an apparatus for carrying out the method of this invention.

This apparatus comprises essentially a pneumatic device for spraying the resin and the catalyst, which co-acts on the one hand with a combined glass fibre cutting and distributing device associated with pneumatic means and on the other hand with electromagnetic and pneumatic means associated with the supply of dehydrating powder, the simultaneous starting and stopping of the aforesaid three devices being controlled by an electric relay system adapted to control likewise the powder feed output as a function of the outputs of the other component elements.

This simultaneous projection apparatus to be described more in detail presently is adapted:

- to add the anhydrous inorganic salts simultaneously with the projection and therefore not to the initial resin mixture;
- to adjust the proportion of inorganic salts as a function of the projection rate so as to constantly keep the metering thereof at the proper value;
- to ensure a proper distribution of the inorganic salts among all the points of the complete mass of laminated product constituting the finished article.

A typical and exemplary form of embodiment of this apparatus will now be described with reference to the single FIGURE of the attached drawing.

In the drawing, a continuous metering distributor of the electromagnetic vibrating type comprises a vibrator 1 provided with a power setting rheostat (not shown in the FIGURE), this vibrator supporting a container 2 filled with dehydrating powder and opening into a funnel 3, this assembly being supported by a column 4. An air injector 10 of the Giffard type opens into the bottom pipe 3A of funnel 3, the air jet being directed axially towards a hose 5 connected at one end to the lower portion of pipe 3A and at its opposite end to a nozzle 5 rigidly attached to a device 7 for cutting and distributing glass fibres, this device 7 being secured in turn to a spray gun 8.

In operation, the powder introduced into the container 2 is vibrated and rises along a helical ramp provided therein (not shown in the drawing); then, the powder falls through and from a spout 2A into the funnel 3 and is propelled from this funnel through the hose 5 and eventually through the nozzle 6 so as to mix up during a simultaneous projection with the flow of resin and catalyst from the spray gun 8 and also with the cut glass fibres distributed by the cutter-distributor 7. This cutter-distributor 7 comprises a casing enclosing a cylinder 7A driven by a compressed air supply (not shown) and driving in turn a rubber-lined cylinder 7B in peripheral driving contact with the glass fibre cutter or roving cylinder 7C.

The simultaneous starting and stopping of the vibrating distributor 1, Giffard injector 10, cutter distributor 7 and spray gun 8 are controlled by an electric relay system (not shown) of known type, also adapted to adjust the power output as a function of the glass fibre and resin outputs, respectively.

With this arrangement it is also possible to adjust or meter very accurately the amounts of hydrophilous anhydrous salts reacting with the free water contained in the molded articles. As mentioned in the foregoing, it was ascertained by practical tests that the proper amount of these anhydrous inorganic salts to be added was within the range of 8% to 12% of the initial weight of resin.

According to this invention, the conventional bubble-removing operation performed during the process is unchanged. When the article can be stripped, it is advantageously heated in an oven to a temperature of 70° to 80° C.

This heating time is reduced by about 50% due to the addition of said anhydrous salts; the homogeneity of the final article is improved due notably to the elimination of the micro-bubbles through the removal of water according to conventional techniques; besides, the articles thus obtained stands up better when fired.

A clearer understanding of this invention may be had from the following exemplary preparation and test reports:

I Preparation and use of finely powdered boric anhydride ($B_2O_3$)

Commercial boric anhydride crystals are introduced into a horizontal bar-type rotary grinder and ground during three hours at the rotational velocity of 60 r.p.m. Since the hydration of boric anhydride yields boric acid, and since resol reticulates due to the action of acid catalysts, the use of boric anhydride additives involves the necessity of reducing the amount of catalyst to be sprayed if it is desired to maintain a sufficient bubble-removing time after the simultaneous spraying or projection. Thus, for example, given a cold mixture of which the amount of catalyst consists as a rule of 20 parts of catalyst (this number being given for a commercial composition utilized without any additive), one may reduce this amount to about 15 to 18 parts if 5 to 8 parts of finely ground boric anhydride are added according to this invention. The useful life of the sprayed mixture will thus remain about 30 minutes.

II Preparation of two initial mixtures for manufacturing laminated articles

In order to set in sharp contrast the properties of the laminated product obtained with the present invention, two initial mixtures A and B are prepared.

Mixture A is a reference mixture used for comparison with mixture B and utilizes a dehydrating additive according to this invention, which acts upon the condensation reaction by rendering same more complete.

Mixture A

| | |
|---|---|
| Resophene PL 5.600, a product of Rhone-Poulenc | 100 parts by weight |
| Hardener P 5.001, also a product of Rhone-Poulenc | 20 parts by weight |
| 5-cm. Cut Roving glass (St-Gobain Industrie) | 25 parts by weight |

Resophene PL 5.600 manufactured by Rhone-Poulenc is obtained through the condensation of formol-phenol in the ratio of more than 1, in an alkaline medium, by forming a linear chain, in the form of a 9 to 10% solution in water.

Hardener P 5.001 also manufactured by Rhone-Poulenc is a co-reticulating catalyst of the phenol-sulfonic acid type.

Mixture B

| | |
|---|---|
| Resophene PL 5.600 (Rhone-Poulenc) | 100 parts by weight |
| Hardener P 5.001 (Rhone-Poulenc) | 16 parts by weight |
| Ground $B_2O_3$ produced by the Borax-Francais Co. | 8 parts by weight |
| 5-cm cut roving glass (St.-Gobain Industrie) | 25 parts by weight |

III Preparation of test plates

From the above mixtures A and B two test plates types are prepared:

(a) a first series of 150 × 15 × 4 mm plates from which the properties and characteristic features such as appearance, shrinkage, loss of weight, flexion module under load $$E = \frac{Fl_v^3}{4\tau h^3 f}$$

according to the French Standard N.F. T 57.105, and the flexion stress under load $$r = 1.5 \frac{F_v L_v}{\tau \cdot h^3}$$

according to the French Standard N.F. T 57.105, are determined.

(b) Another series of 150 × 6 × 3 mm test plates for determining the limit oxygen number according to the ASTM D 2863.70 test.

The average results are as follows:

Appearance

Test plate obtained from Mixture A:
(Without additive) The glass fibres has a white appearance.
An inhibition appears at the fibre level.
Test plate obtained from Mixture B:
(With additive) The glass fibre is no more visible on the surface, and the white color along the fibres has disappeared.

Shrinkage

| Shrinkage | |
|---|---|
| Without additive: average shrinkage | 0.85% |
| With additive (ground $B_2O_3$) : average | 0.50% |

The shrinkage of test plates with additive is only 58% that of test plates without additive.

Loss in drying oven

| Loss in drying oven | |
|---|---|
| Without additive : average loss of water | 15.25% |
| With additive (ground $B_2O_3$) average | 11.00% |

The loss of water is only 72% in the case of test plates with additive, compared with that of test plates without additive.

Flexion module E

| Flexion module E | |
|---|---|
| Without additive : average value of E | 194.2 |
| With additive (ground $B_2O_3$), average value of E | 238.0 |
| A 22.5% increment of Module E is obtained. | |

Flexion stress

| Flexion stress | |
|---|---|
| Without additive: average value | 6.2 |
| With additive (ground $B_2C_3$) average value. | 6.5 |
| A 5% flexion stress increment is obtained. | |

Oxygen limit number

| Oxygen limit number | |
|---|---|
| Without additive | 44.5 |
| With additive (ground $B_2C_3$) | 78. |

It may be emphasized that this oxygen limit number reading from test plates with additive, i.e. this volume concentration of 78% of oxygen necessary for 22% of nitrogen for maintaining the combustion under test conditions, is quite remarkable.

On the other hand, comparisons were made in connection with the holding of substrata or gel-coat on phenol laminations with and without ground $B_2O_3$ addition.

For this purpose, HET-acid polyesters catalysed with benzoyl peroxydes and accelerated by using cobalt naphthenates for preparing substrata or gel-coat onto which laminated structure have been projected have been used. These laminated structures consisted:
either of resophene PL 5.600, hardener P 5.001, glass, without additive,
or resophene PL 5.600, hardener P 5.001, glass, with the addition of $B_2O_3$.

The first laminations do not hold when scratched crosswise to form lines spaced 1 mm from each other, whereas the last-mentioned laminations hold safely. This adherence is further improved if 3% of boric anhydride are added to the gel-coat.

Of course, this invention should not be construed as being strictly limited by the shapes, forms of embodiment and details disclosed hereinabove, since it also covers all pneumatic, mechanical, electronic and similar methods permitting the dehydrating addition of the glass fibres or other reinforcing substance, during the impregnation stage through the resin-hardener mixture.

This generalization will be better understood from the following typical and exemplary applications given by way of illustration, not of limitation:

(1°) In the filamentary winding method, the additive is distributed on the resin-loaded glass wire.

(2°) In a method utilizing the continuous impregnation and pultrusion, the additive is distributed at the impregnation station throughout the width of the glass fibre sheet.

(3°) In a centrifugation method the additive is incorporated when depositing the reinforcing substance and the resin mixture into the mould of revolution.

(4°) In a method based on the compression injection or molding the additive is incorporated in the glass reinforcing substance disposed in the mold before introducing the resin mixture.

(5°) The additive according to this invention may also be incorporated in other forms of embodiment known in the art.

What is claimed as new is:

1. In a method of manufacturing molded articles of liquid phenol resins or resols wherein main component elements comprising at least one resin of the aforesaid type, glass reinforcing elements and at least one acid catalyst are simultaneously projected onto a mold surface, the improvement comprising simultaneously projecting at least one anhydrous and hydrophilous inorganic compound selected from the group consisting of semi-hydrated calcium sulphate $(SO_4Ca)H_2O$ and finely powdered boric anhydride $B_2O_3$ with said main component elements in an amount corresponding to from about 8 to 12% of the weight of the liquid phenol resin.

2. The method according to claim 1 wherein the anhydrous hydrophilous compound consists of semi-hydrated calcium sulfate prepared from sulfuric acid neutralized with milk of lime, the resultant product being filtered and washed and then dehydrated at a temperature of about 130° C before use.

3. The method according to claim 1 wherein said anhydrous inorganic hydrophilous compound is utilized in combination with any other molding methods implementing pneumatic, mechanical, electronic, compound and/or similar means for impregnating a glass fibre or other reinforcing elements by means of a resin-cum-hardener mixture.

4. Molded resin article or part having improved mechanical and fire-resisting properties, obtained by employing the method of claim 1.

* * * * *